Oct. 25, 1932.  G. M. HURD  1,884,974
WATER PUMP
Filed Jan. 12, 1931
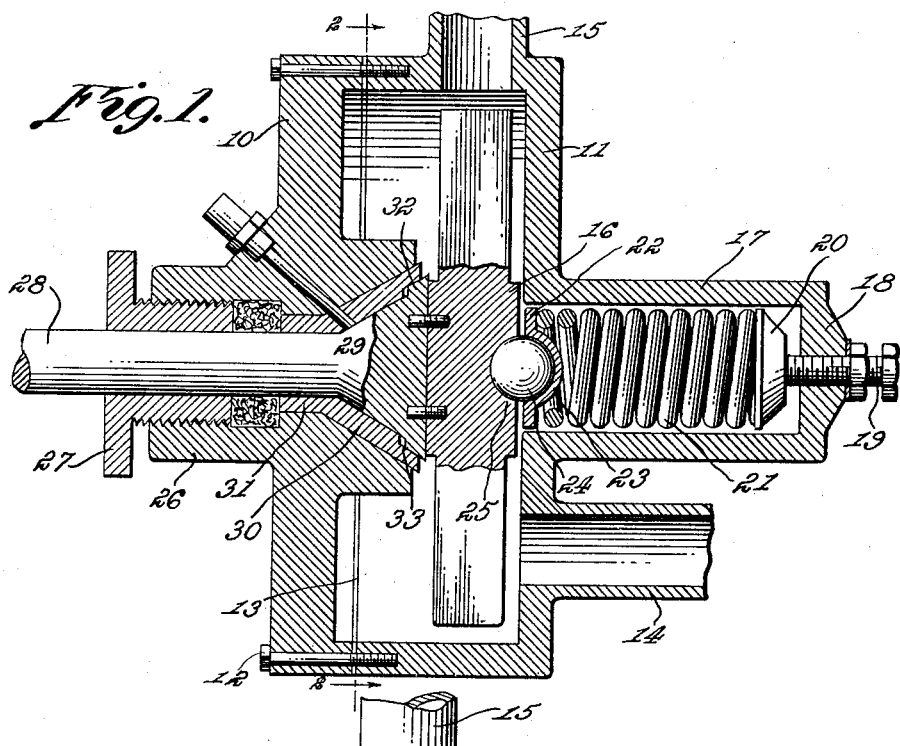
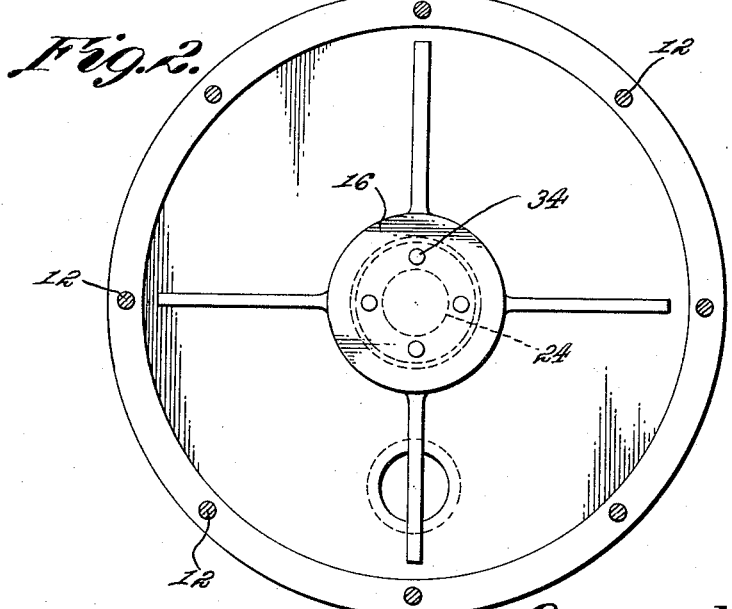
George M. Hurd,
INVENTOR
BY Victor J. Evans
and A. L. Evans
ATTORNEYS Patented Oct. 25, 1932

1,884,974

UNITED STATES PATENT OFFICE

GEORGE M. HURD, OF SOUTH BEND, INDIANA

WATER PUMP

Application filed January 12, 1931. Serial No. 508,277.

This invention relates to certain new and useful improvements in water and other pumps having for its principal object a novel form of shaft mounting rendering the pump leak proof.

Another of the objects of the invention consists of a detachable driving connection between the pump agitator blade and shaft whereby the latter may remain within the pump housing irrespective of the agitator.

Another of the objects of the invention consists of an adjustable ball check-valve having contacting engagement with the other side of the agitator to yieldably retain the latter in position for use.

More specifically stated the shaft and bearing therefor constitute a tapered joint to obviate undue rectilinear motion of the shaft.

With the above and other objects in view, the invention further consists of the following novel features and details of construction, to be hereinafter more fully described, illustrated in the accompanying drawing and pointed out in the appended claim.

In the drawing:—

Figure 1 is a longitudinal sectional view taken through the invention.

Figure 2 is a view taken on line 2—2 of Figure 1.

Referring to the drawing in detail wherein like characters of reference denote corresponding parts, the reference characters 10 and 11 indicate the sections of the pump housing which are held together at the abutting portions thereof through the employment of cap screws 12 and rendered leak-proof by a suitable form of packing or gasket material 13. The section 11 is provided with inlet and outlet pipes or conduits 14 and 15 respectively arranged in the manner best shown in Figure 1 of the drawing for cooperation with the agitator or impeller blade. The hub 16 of the agitator is disposed in confronting relation across the entrance end of a tubular extension 17 carried by and having communication with the housing section 11. A wall 18, transversely positioned within the outermost end of the tubular extension, carries an adjusting bolt 19 having engagement with a frusto-conically shaped washer 20 for accommodating the adjacent end convolution of a compression spring 21. A washer member 22 having engagement with the opposite end convolution of the compression spring is provided with a semicircular cup-shaped portion 23 projecting within the bore of the spring for partially accommodating a ball bearing 24. A seat 25, of approximate semi-circular formation, is arranged within the adjacent side of the aforementioned hub for the accommodation of the remaining portion of the ball bearing 24.

The section 10 of the housing is also provided with a tubular extension 26 having a packing gland 27 adjustably accommodating an appropriate portion of the pump shaft 28 which may support and operate a fan or the like, not shown.

A tapered head 29, formed upon the innermost end of the pump shaft 28, is designed for seating engagement against the adjacent bore of a telescopically associated bearing sleeve 30 having a sleeve-like extension 31 projecting from the smaller outermost projecting end thereof disposed for cooperation with the packing gland 27 and journally supporting the straight portion of the pump shaft 28. The tapered head is enlarged, as at 32, peripherally thereof adjacent its innermost end and shaped after the manner of an internal-combustion engine poppet valve and for accommodation within an annular groove 33 in the bearing sleeve 30.

From the foregoing arrangement it will be noted that the joint between the tapered head of the pump shaft and the bearing sleeve will be a broken one to obviate passage and leakage of fluid from the housing. In actual practice, there will be a film of lubricant present between the journally associated portions of the sleeves and pump shaft head to the approximate thickness of one-thousandth of an inch. Pin members 34, carried upon the inner side of the head 29 and projecting rectilineally of the pump shaft, protrude for appreciable distances therefrom for threaded engagement within the adjacent side of the agitator or impeller blade hub to establish a driving connection between the impeller and pump shaft.

It is obviously apparent from the foregoing description and accompanying drawing that the ball bearing 24, having yieldable contacting engagement with the agitator or impeller blade, will serve to preserve the driving connection established between the other side of the impeller blade hub and pump shaft whereby wobbling or other distortions, noises and the like, on the part of the impeller blade will be obviated. The enlarged head of the pump shaft will be also yieldably retained in seating engagement with relation to the bearing sleeve 30 and rectilinear shifting motion obviated.

The invention is susceptible of various changes in its form, proportions and minor details of construction and the right is herein reserved to make such changes as properly fall within the scope of the appended claim.

Having described the invention, what is claimed is:

A rotary pump comprising a casing having inlet and outlet ports and provided at opposite sides with tubular extensions, a funnel-shaped bearing sleeve fitting snugly within the inner end of one of said extensions, said sleeve having a plurality of interiorly located conical bearing surfaces, a shaft journaled in said extension and having a head provided with a plurality of cone-shaped surfaces bearing against corresponding surfaces of the sleeve, an impeller housed in the casing and having at its hub portion a series of pins entering the end of said head, and a spring-pressed bearing member housed in the other extension and bearing against the side of the impeller in alinement with the axis of said shaft.

In testimony whereof I affix my signature.

GEORGE M. HURD.